US011982849B2

(12) United States Patent
Wang et al.

(10) Patent No.: US 11,982,849 B2
(45) Date of Patent: May 14, 2024

(54) SYSTEM AND APPARATUS OF CONTROLLING RING RESONATOR OPERATING POINTS

(71) Applicant: Alpine Optoelectronics, Inc., Fremont, CA (US)

(72) Inventors: Tongqing Wang, Newark, CA (US); Xingyu Zhang, Fremont, CA (US); Dawei Zheng, Irvine, CA (US); Zhoufeng Ying, Milpitas, CA (US)

( * ) Notice: Subject to any disclaimer, the term of this patent is extended or adjusted under 35 U.S.C. 154(b) by 262 days.

(21) Appl. No.: 17/522,337

(22) Filed: Nov. 9, 2021

(65) Prior Publication Data

US 2022/0146766 A1 May 12, 2022

Related U.S. Application Data

(60) Provisional application No. 63/112,113, filed on Nov. 10, 2020.

(51) Int. Cl.
| | |
|---|---|
| *G02B 6/42* | (2006.01) |
| *G02B 6/293* | (2006.01) |
| *H04B 10/077* | (2013.01) |
| *H04B 10/50* | (2013.01) |
| *H04B 10/66* | (2013.01) |
| *H04J 14/02* | (2006.01) |
| *H04J 14/04* | (2006.01) |

(52) U.S. Cl.
CPC ........... *G02B 6/4215* (2013.01); *G02B 6/425* (2013.01); *H04B 10/077* (2013.01); *H04B 10/505* (2013.01); *H04B 10/506* (2013.01); *H04B 10/66* (2013.01); *H04J 14/02* (2013.01); *H04J 14/04* (2013.01); *G02B 6/29343* (2013.01)

(58) Field of Classification Search
CPC .. G02B 6/4215; G02B 6/425; G02B 6/29343; G02B 6/29395; G02B 6/12007; H04B 10/505; H04B 10/506; H04B 10/66; H04B 10/5051; H04J 14/02; H04J 14/04
See application file for complete search history.

(56) References Cited

U.S. PATENT DOCUMENTS 9,954,618 B1 * 4/2018 Dong ................. H04B 10/5051
2012/0105177 A1 * 5/2012 McLaren .............. G02F 1/0147
333/17.1

(Continued)

*Primary Examiner* — Leslie C Pascal
(74) *Attorney, Agent, or Firm* — CIONCA IP Law P.C.

(57) ABSTRACT

A method and system for locking the resonance frequency of ring resonators by using laser sources to emit a plurality of different wavelengths, applying a tagging signal to each of the wavelengths, multiplexing the tagged wavelengths using a wavelength division multiplexor, coupling the multiplexed tagged wavelengths onto a bus waveguide, detecting the multiplexed tagged wavelengths with a first photodetector disposed before a first ring resonator and a second photodetector disposed after a last ring resonator of a plurality of ring resonators, sending the signals detected by the first and second photodetector to a processor, which identifies and processes the tagging signals, generating a control signal for each ring resonator, by the processor and applying the control signals to phase shifters on each ring resonator of the plurality of ring resonators to tune and align the resonance wavelengths of the ring resonators with the wavelengths of the corresponding laser sources.

18 Claims, 6 Drawing Sheets

(56) References Cited

U.S. PATENT DOCUMENTS

| | | | | |
|---|---|---|---|---|
| 2015/0132015 A1* | 5/2015 | Hayakawa | ............... | G02B 6/28 |
| | | | | 385/2 |
| 2017/0139236 A1* | 5/2017 | Cao | ................... | G02B 6/29338 |
| 2017/0261692 A1* | 9/2017 | Knights | ............. | G02B 6/12007 |
| 2020/0145123 A1* | 5/2020 | Melikyan | ................ | G02F 1/011 |
| 2023/0353251 A1* | 11/2023 | Davenport | ........... | H04B 10/506 |

* cited by examiner

SYSTEM AND APPARATUS OF CONTROLLING RING RESONATOR OPERATING POINTS

CROSS-REFERENCE TO RELATED APPLICATIONS

This application claims the benefit of U.S. Provisional Application No. 63/112,113, filed Nov. 10, 2020, which is hereby incorporated by reference, to the extent that it is not conflicting with the present application.

BACKGROUND OF INVENTION

1. Field of the Invention

The invention relates generally to ring resonators and more specifically to a system and apparatus of controlling ring resonator operating points.

2. Description of the Related Art

Integrated ring resonators have potential applications in next-generation integrated photonics devices and systems because of its compact size, low-power consumption, and unique wavelength division multiplexing (WDM) feature. In particular, a large number of ring resonators can be integrated onto the same chip within a small footprint, which is useful for dense division wavelength division multiplexing (DWDM) applications (e.g. 40 wavelengths being used). In a DWDM application, the ring resonators are each operated at different wavelengths on DWDM grids. The operation wavelength of each ring resonator has to work near the respective source wavelength in order to achieve desirable performance. The resonance wavelength of a ring resonator is sensitive to environmental temperature and process variation; therefore, controlling ring resonance wavelength becomes critical.

An existing conventional method is to lock each ring resonator individually. One method is to integrate a phase shifter onto each ring resonator for wavelength tuning. A control signal is applied to the phase shifter integrated onto the ring resonator, then a photodetector is used to monitor the power variation. A feedback signal is provided to the phase shifter to lock the resonance of the ring to a desired wavelength, which is realized by a control circuit or a processor. Unfortunately, when more and more rings are integrated on the same chip, such as 40 rings for DWDM applications, the wavelength locking of so many ring resonators individually become complicated and challenging.

Therefore, there is a need to provide a system and apparatus for locking ring resonator operating points which can simply, easily, and efficiently lock a large number of ring resonator operating points.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an aspect, an integrated photonics structure to control resonance wavelengths of multiple ring resonators through frequency division, time division, code division, or hybrid approach tagging systems, is provided. Such a photonics apparatus may be used for dense wavelength division multiplexing wavelength grids.

In an aspect, a photonics apparatus comprising, a plurality of laser sources, a laser source tagging system, wherein the tagging system applies dithering signals to tag the wavelengths emitted by the plurality of laser sources, a wavelength division multiplexer which multiplexed the tagged wavelengths, a carrier which couples the multiplexed tagged wavelengths to a bus waveguide, a bus waveguide, a plurality of ring resonators, a first photodetector disposed before a plurality of ring resonators, a second photodetector associated disposed after the plurality ring resonators, and a processor, is provided.

In an aspect, the number or ring resonators and laser sources are equal and the ring resonators are all-pass ring resonators with integrated phase shifters. The processor is configured to process the signals from the first and second photodetectors and generate control signals, which are applied to the phase shifter on each of the ring resonators tune the resonance wavelengths of each ring to match a laser source. Thereby controlling the ring resonator operating points.

In an aspect, a frequency division wavelength tagging system is used. In such a system, the tagging signals applied to the wavelengths emitted by the light sources are different dithering signals for each wavelength. Alternatively, a time division wavelength system is used, wherein the tagging signals applied to the wavelengths emitted by the light sources are the same dithering signal applied to the wavelengths at specific time slot. A code division wavelength tagging system may also be used, wherein the tagging signals applied to the wavelengths emitted by the light sources are dithering signals applied at specific codes. A hybrid time division and frequency division wavelength tagging system may also be used.

In one aspect, the wavelengths emitted by the laser sources are part of one band. In another aspect, the wavelengths emitted by the laser sources are divided into a plurality of bands.

In another aspect, photonics apparatus comprising an input port, a bus waveguide, a plurality of ring resonators associated with the bus waveguide, a first photodetector disposed before the plurality of ring resonators, a plurality of broadband photodetectors each disposed after each of the plurality of ring resonators, and a processor. The broadband photodetectors are configured to detect the dithering signals and data signals. The processor is configured to process the dithering signals detected by the first photodetector and the plurality of broadband photodetectors and to generate control signals to control the resonance wavelengths of the plurality of ring resonators. Using the ring operating-point control procedures disclosed hereinabove, the ring resonators can function as wavelength selectors and allow the chip to drop any optical beam to any data receiving port (not shown). This ability is very important for wavelength reconfiguration networks, wherein a different wavelength (i.e., optical beam) may need to be dropped to the same port at different times. Such an aspect can be applied to various integrated photonics platform, including but not limited to silicon, silicon nitride, silica, Lithium Niobate, polymer, III-V materials, etc. The photonics apparatus can be used for not only C-band, but also for other extended wavelength range including but not limited to visible light range, O, E, S and L band.

In another aspect, a method of locking the resonance frequency of ring resonators starts by first using laser sources to emit a plurality of different wavelengths. Next step is applying a tagging signal to each of the wavelengths. Then, multiplexing the tagged wavelengths onto a single output carrier or port with a wavelength division multiplexor. Coupling the multiplexed tagged wavelengths onto a bus waveguide with the carrier. Then, detecting the multiplexed tagged wavelengths with a first photodetector disposed before the first ring resonator and a second photodetector disposed after the last ring resonator. Sending the signals detected by the first and second photodetector to a processor, wherein the locking processor identifies the tagging signals. Having the processor processes the characteristics of the tagging elements. Then, generating a control signal for each ring resonator with the processor. Finally, applying those control signals to the phase shifters on the ring resonators to tune and align the resonance wavelengths of the ring resonators with the wavelengths of the corresponding laser sources. The above control process may be continuous to ensure proper operation.

The above aspects or examples and advantages, as well as other aspects or examples and advantages, will become apparent from the ensuing description and accompanying drawings.

BRIEF DESCRIPTION OF THE DRAWINGS

For exemplification purposes, and not for limitation purposes, aspects, embodiments or examples of the invention are illustrated in the figures of the accompanying drawings, in which.

DETAILED DESCRIPTION

Figure 1:
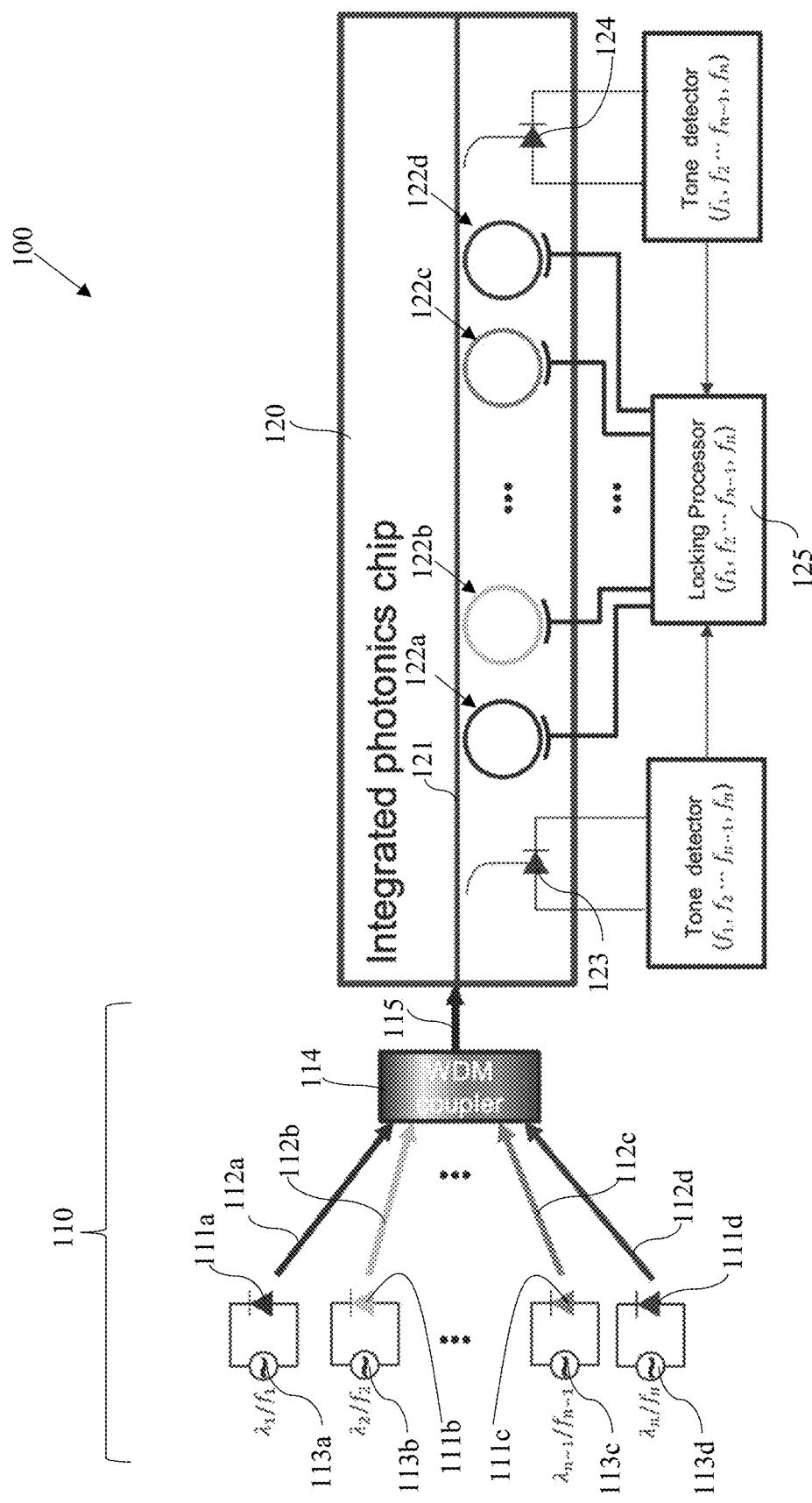
FIG. 1 illustrates an exemplary embodiment of a photonics structure which locks the resonance wavelengths of a plurality of ring resonators using a frequency division approach, according to an aspect.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

It should be understood that, for clarity of the drawings and of the specification, some or all details about some structural components or steps that are known in the art are not shown or described if they are not necessary for the invention to be understood by one of ordinary skills in the art.

For the following description, it can be assumed that most correspondingly labeled elements across the figures (e.g., 114 and 214, etc.) possess the same characteristics and are subject to the same structure and function. If there is a difference between correspondingly labeled elements that is not pointed out, and this difference results in a non-corresponding structure or function of an element for a particular embodiment, example or aspect, then the conflicting description given for that particular embodiment, example or aspect shall govern.

FIG. 1 illustrates an exemplary embodiment of a photonics apparatus 100 which locks the resonance wavelengths of a plurality of ring resonators 122a-d using a frequency division tagging system, according to an aspect. Such an integrated photonics apparatus may have many applications in next-generation integrated photonics devices and systems due to its compact size and low-power consumption. As an example, the photonics apparatus 100 may be used in dense wavelength division multiplexing (DWDM) applications, wherein for example 40 wavelengths and 40 corresponding ring resonators may be used, as disclosed in greater detail hereinafter.

In the exemplary embodiment shown in FIG. 1, the photonics apparatus 100 may utilize a frequency division tagging system to lock each ring resonator to a pre-defined operational wavelength with any channel spacing, as disclosed in greater detail hereinafter. The photonics apparatus 100 may comprise a dense wavelength division multiplexing transmitter system (DWDM transmitter system) 110 and an integrated photonics chip 120. The DWDM transmitter system 110 may comprise a plurality of laser sources 111a-d each emitting light at different wavelengths, a plurality of dithering signals 113a-d, a wavelength division multiplexer coupler (WDM coupler) 114, an output carrier 115, as disclosed in greater detail hereinafter. The integrated photonics chip 120 may comprise a bus waveguide (bus) 121, a plurality of ring resonators (rings) 122a-d, two photodetectors 123 and 124, and a ring locking processor (locking processor, processor) 125 as disclosed in greater detail hereinafter.

First, the DWDM transmitter system 110 may comprise a plurality of laser sources 111a-d to emit light at different wavelengths. The laser sources 111a-d may each be tuned to a predefined wavelength, for example a DWDM grid or DWDM channel. Then, a plurality of different dithering signals 113a-d are applied to each of the laser sources 111a-d, such that each emitted light beam with a predefined wavelength 112a-d is tagged/labeled by a specific dithering signal. Thus, each predefined wavelength can be identified by its respective dithering signal detected by the photodetectors 123,124, as disclosed in greater detail hereinafter. As an example, for DWDM applications there may be 40 laser sources 111a-d emitting light at 40 different wavelengths with 40 different dithering signals 113a-d, respectively. In a frequency division approach for locking the resonance wavelengths of ring resonators, the dithering signals 113a-d used may be a set of small signals which are composed of different dithering frequencies (e.g. in the scale of kHz to MHz) and applied to the laser sources 111a-d. It should be noted that the dithering frequency should be chosen such that they do not interfering with each other.

The plurality of wavelengths tagged by dithering signals 112a-d are then multiplexed onto a single carrier/output 115 by a WDM coupler 114. As an example, the carrier 115 may be a single fiber carrier. The carrier 115 then couples the multiplexed wavelengths onto the integrated photonics chip 120 via a bus waveguide (bus) 121. Integrated along the bus 121 are a first photodetector 123 disposed before the first ring resonator 122a, a plurality of ring resonators 122a-d disposed after the first photodetector 123, and a second photodetector 124 disposed after the last ring resonators 122d. As an example, each ring resonator 122a-d may be configured as a data ring modulator with an integrated phase shifter, wherein the integrated phase shifter may be used to set the operation point (i.e., resonance wavelength) of the ring modulator via an applied control signal, as disclosed in greater detail hereinafter. Additionally, the number of ring resonators 122a-d may equal the number of wavelengths 112a-d, such that each ring resonator 122a-d is tuned to work with a respective wavelength 112a-d. It should be noted that a ring resonator is typically designed to have a wide tuning range and be capable of working with multiple wavelengths.

As the multiplexed wavelengths propagate along the bus 121, only the wavelength close to ring resonant frequency enters into the ring and is modulated by a modulation signal applied to the ring (not shown). The operation point of each ring resonator may be set such that the resonance wavelength corresponds to the predefined wavelength 112a-d from one of laser sources 111a-d. For example, the wavelength of the light emitted by laser source 111a corresponds to the resonance wavelength of ring resonator 112a, the wavelength of laser source 111b corresponds to the resonance wavelength of 112b, the wavelength of laser source 111c corresponds to the resonance wavelength of 112c, and the wavelength of laser source 111d corresponds to the resonance wavelength of 112d. As an example, the modulation signal may be a high-speed data signal (e.g., 100 Gbps PAM4 data signal which is not shown in the figure) applied to the ring resonator. Thus, wavelength emitted by the laser source can be modulated. Lastly, the data modulated optical signals coming out of each ring modulator propagate along the bus waveguide and exit the integrated photonics chip 120.

In order to lock the resonance wavelength of all the rings 122a-d to the corresponding predefined laser source 111a-d wavelengths, two on-chip tapped photodetectors (PDs) 123, 124 disposed before the first ring 122a and after the last ring 122d, are used to detect the small dithering signals 113a-b (e.g. in the range of kHz to MHz), as disclosed hereinbelow. It should be understood that each dithering signal detected identifies a specific wavelength of light from one of the laser sources. For the frequency division approach of locking ring resonators shown in FIG. 1, the photodetectors 123,124 may act as tone detectors, for example. Next, the detected dithering signals from the two PDs 123,125 are sent to a processor 125, where each of the dithering signal's characteristics (e.g. photocurrent (amplitude and phase) ratio of the dithering signals detected by the second PD over the first PD) is processed to identify the dithering signal and determine the operation point of a respective ring to a predefined wavelength. Then the processor 125 uses the identified dithering signals to generate a specific control signal for each individual ring resonator 122a-d. For each individual ring resonator 122a-d, the specific control signal is sent to its integrated phase shifter, such that the resonance wavelength of the ring can be tuned to align with a specific laser wavelength.

More specifically, the photocurrent ratio (amplitude and phase) of the dither signals detected by the second PD 124 over the first PD 123 can be used to determine the control signal based on how the dithering signals are affected as they propagate along the bus and ring resonators. The dithering signal detected by the first PD 123 is known and unaffected by the ring resonators, while the dithering signal detected by the second PD 124 has been affected by the ring resonators. When the resonance frequency (wavelength) of a ring resonator is close to matching the corresponding wavelength of its respective source laser, then the dithering signal detected by the second PD 124 will differ from the unaffected dithering signal detected by the first PD 123 based on the wavelength difference between the resonance wavelength of the ring resonator and the wavelength of the laser source. When the two wavelengths are the same (identical), the fundamental component of the dithering signal detected by the second PD 124 reaches a minimum point, wherein the frequency modulated component caused by the dithering signal has opposite effect before and after the minimum point. Thus, the changes in the dithering signal can be used to tune and align (i.e., lock) the resonance wavelengths of the rings to the source laser wavelengths. It should be noted that the control process disclosed above is a continuing process.

Figure 2:
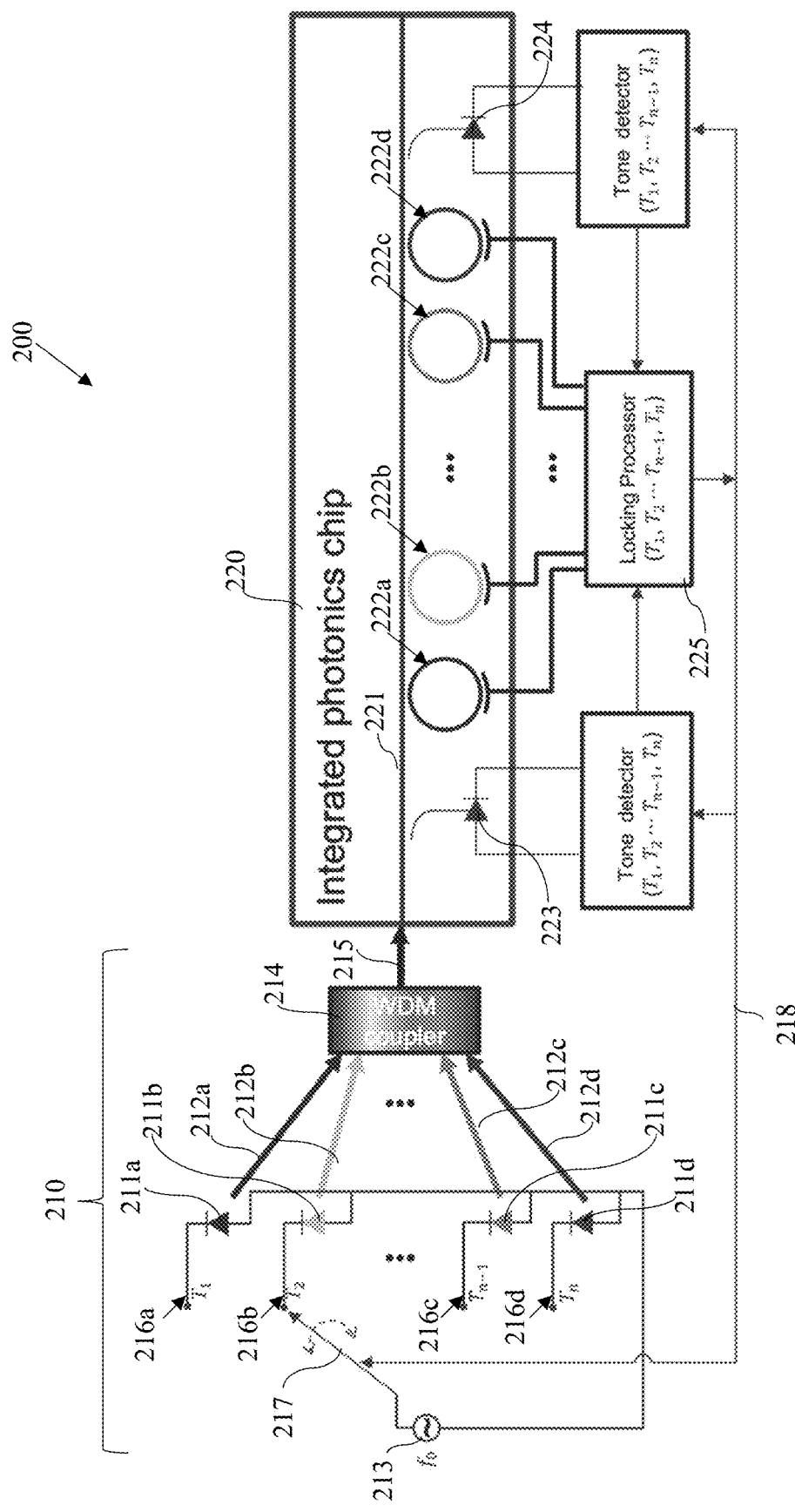
FIG. 2 illustrates an alternate embodiment of a photonics structure which locks the resonance wavelengths of a plurality of ring resonators using a time division approach, according to an aspect.

FIG. 2 illustrates an alternate embodiment of a photonics apparatus 200 which locks the resonance wavelengths of a plurality of ring resonators 222a-d using a time division approach, according to an aspect. In the exemplary embodiment shown in FIG. 2, the photonics apparatus 200 may utilize a time division tag to lock each ring resonator to a pre-defined operational wavelength with any channel spacing, as disclosed in greater detail hereinafter. The photonics apparatus 200 may comprise a dense wavelength division multiplexing transmitter system (DWDM transmitter system) 210 and an integrated photonics chip 220. The DWDM transmitter system 210 may comprise a plurality of laser sources 211a-d each emitting light at different wavelengths, a single dithering signal 213, a wavelength division multiplexer coupler (WDM coupler) 214, a carrier 215, as disclosed in greater detail hereinafter. The integrated photonics chip 220 may comprise a bus waveguide (bus) 221, a plurality of ring resonators (rings) 222a-d, two photodetectors 223 and 224, and a ring locking processor (locking processor, processor) 225 as disclosed in greater detail hereinafter.

First, a time period T is divided into a plurality of time slots 216a-d (e.g., n time slots), wherein the number of time slots equals the number of laser sources, for example. Then each time slot is assigned to one of the plurality of laser sources 211a-d. Next, the DWDM transmitter system 210 comprises a plurality of laser sources 111a-d to emit light at different wavelengths. Then, the single tone dithering signal (at a single frequency) is selectively applied 217 onto one single laser source at its assigned time slot. For example, dithering signal 213 is applied to laser source 211a at time slot 216a ($T_1$). Thus, each emitted wavelengths 212a-d are tagged/labeled by the same dithering signal applied at a specific time slot.

The plurality of wavelengths 212a-d are then multiplexed onto a carrier 215 by a WDM coupler 214. As an example, the carrier 215 may be a single fiber carrier. The carrier 215 then couples the multiplexed wavelengths onto the integrated photonics chip 220 via a bus waveguide (bus) 221. Integrated along the bus 221 are a first photodetector 223 disposed before the first ring resonator 222a, a plurality of ring resonators 222a-d disposed after the first photo detector 223, and a second photodetector 224 disposed after the last ring resonators 222d. As an example, each ring resonator 222a-d may be a ring modulator with an integrated phase shifter, wherein the integrated phase shifter may be used to set the operation point (i.e., resonance wavelength) of the ring resonator via an applied control signal. Additionally, the number of ring resonators 222a-d may equal the number of wavelengths 212a-d, such that each wavelength 212a-d has a respective ring resonator 222a-d.

As the multiplexed wavelengths propagate along the bus 221, they enter into a plurality of different ring resonators (rings) 222a-d, where the optical signals of the multiplexed wavelengths are modulated. The operation point of each ring resonator may be set such that the resonance wavelength corresponds to the predefined wavelength 212a-d from one of laser sources 211a-d. For example, the wavelength of the light emitted by laser source 211a corresponds to the resonance wavelength of ring resonator 212a. Lastly, the modulated optical signals coming out of each ring modulator propagate along the bus waveguide and exit the integrated photonics chip 220. The two PDs work as tone detectors to detect the dithering signals at the corresponding time slot. The detected dithering signals at each time slot are sent to the processor.

In order to lock the resonance wavelength of all the rings 222a-d to the corresponding predefined laser source 211a-d wavelengths, two on-chip tapped photodetectors (PDs) 223, 224, disposed before the first ring 222a and after the last ring 222d, are used detect the dithering signal 213 applied to the laser sources at each time slot. It should be understood that time slot within which the dithering signal is detected identifies a specific wavelength of light from one of the laser sources. The photodetectors 223,224 may act as tone detectors, for example. Next, the detected dithering signals from the two PDs 223,225 are sent to a processor 225, where the dithering signal characteristics (e.g., photocurrent (amplitude and phase) ratio of the dithering signals detected by the second PD over the first PD) at each time slot is processed. Then the processor 225 generate a specific control signal for each individual ring resonator 222a-d. The control signal is sent to the integrated phase shifter of each ring 222a-d, such that the resonance wavelength of the ring can be tuned to align with a specific laser wavelength. It should be understood that the control process is a continuing process. It may be repeated at the time period interval. Additionally, a sync signal 218 may be applied between the DWDM transmitter system 210 and the integrated photonics chip 220 to synchronize and assign a time slot for a pair of each individual ring and laser.

Figure 3:
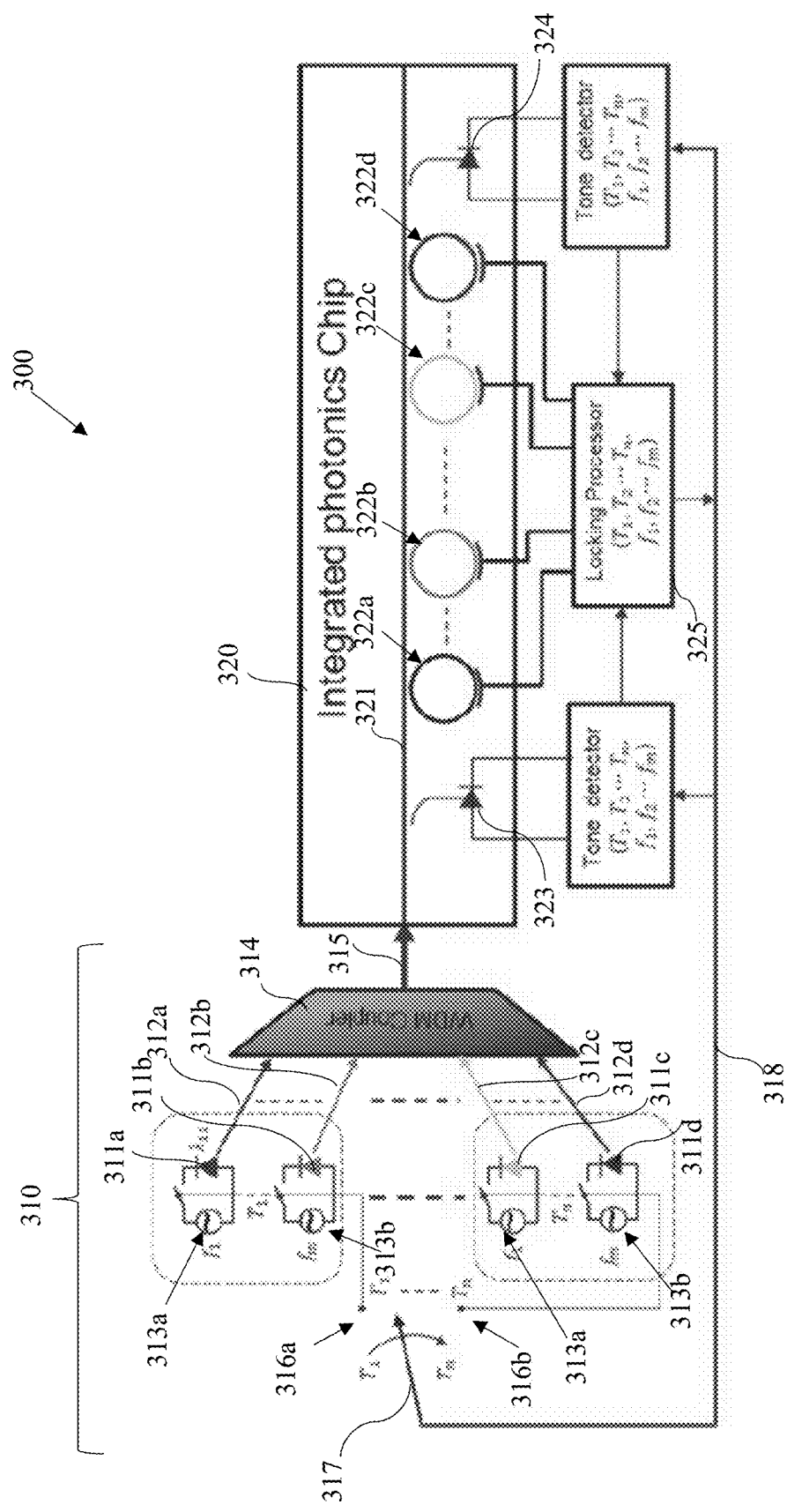
FIG. 3 illustrates another embodiment of a photonics structure which locks the resonance wavelengths of a plurality of ring resonators using a hybrid frequency division and time division approach, according to an aspect.

FIG. 3 illustrates another embodiment of a photonics apparatus 300 which locks the resonance wavelengths of a plurality of ring resonators 322a-d using a hybrid frequency division and time division approach, according to an aspect. Combing the frequency division and time division approaches into a hybrid approach is beneficial because the hybrid approach reduces the number of dithering frequencies needed and the reduces the control time period.

In the exemplary embodiment shown in FIG. 3, the photonics apparatus 300 may utilize a hybrid frequency and time division tag to lock each ring resonator to a pre-defined operational wavelength with any channel spacing, as disclosed in greater detail hereinafter. The photonics apparatus 300 may comprise a dense wavelength division multiplexing transmitter system (DWDM transmitter system) 310 and an integrated photonics chip 320. The DWDM transmitter system 310 may comprise a plurality of laser sources 311a-d each emitting light at different wavelengths, a plurality of dithering signals 313a,b, a wavelength division multiplexer coupler (WDM coupler) 314, a carrier 315, as disclosed in greater detail hereinafter. The integrated photonics chip 320 may comprise a bus waveguide (bus) 321, a plurality of ring resonators (rings) 322a-d, two photodetectors 323 and 324, and a ring locking processor (locking processor, processor) 325 as disclosed in greater detail hereinafter.

First, a time period T is divided into n time slots 316a,b and each time slot is assigned to n groups of m laser sources. As an example, the number of time periods may be n=10 and the number of laser sources in each group may be m=4, thus a total of 40 laser sources. Next, the DWDM transmitter system 310 comprises a plurality of laser sources 311a-d to emit light at different wavelengths. Dithering signals 313a,b selectively applied 317 to each group of the laser sources 311a-d at its respective time slot 316a,b, such that each emitted wavelengths 312a-d have a specific predefined wavelength with a specific dithering signal applied at a specific time slot. Thus, each predefined wavelength can be identified by the photodetectors 323,324 via its respective dithering signal and time slot. As an example, the dithering signals 313a,b used may be small dithering signals set to different dithering frequencies (e.g. in the range of kHz to MHz). It should be noted that the dithering frequency should be chosen such that they do not interfering with each other.

The plurality of wavelengths with dithering signals 313a,b at assigned time slots are then multiplexed onto a carrier 315 by a WDM coupler 314. As an example, the carrier 315 may be a single fiber carrier. The carrier 315 then couples the multiplexed wavelengths onto the integrated photonics chip 320 via a bus waveguide (bus) 321. Integrated along the bus 321 are a first photodetector 323 disposed before the first ring resonator 322a, a plurality of ring resonators 322a-d disposed after the first photo detector 323, and a second photodetector 324 disposed after the last ring resonators 322d. As an example, each ring resonator 322a-d may be a ring modulator with an integrated phase shifter, wherein the integrated phase shifter may be used to set the operation point (i.e., resonance wavelength) of the ring resonator via an applied control signal, as disclosed in greater detail hereinafter. Additionally, the number of ring resonators 322a-d may equal the number of wavelengths 312a-d, such that each wavelength 312a-d has a respective ring resonator 322a-d.

As the multiplexed wavelengths propagate along the bus 321, they enter into a plurality of different ring resonators (rings) 322a-d, where the optical signals of the multiplexed wavelengths are modulated. The operation point of each ring resonator may be set such that the resonance wavelength corresponds to the predefined wavelength 312a-d from one of laser sources 311a-d. For example, the wavelength of the light emitted by laser source 311a corresponds to the resonance wavelength of ring resonator 312a. Lastly, the data modulated optical signals coming out of each ring modulator propagate along the bus waveguide and exit the integrated photonics chip 320.

In order to lock the resonance wavelength of all the rings 322a-d to the corresponding predefined laser source 311a-d wavelengths, two on-chip tapped photodetectors (PDs) 323, 324, disposed before the first ring 322a and after the last ring 322d, are used detect the small dithering signals 313a,b at each time slot. The photodetectors 323,324 may act as tone detectors, for example. Next, the detected dithering signals 313a,b at each time slot from the two PDs 323,325 are sent to a processor 325, where each of the dithering signal's characteristics (e.g. photocurrent (amplitude and phase) ratio of the dithering signals detected by the second PD over the first PD) is processed to identify the dithering signal at a specific time slot. Then the processor 325 uses the identified dithering signals and time slots to generate a specific control signal for each individual ring resonator 322a-d. For each individual ring resonator 322a-d, the specific control signal is sent to its integrated phase shifter, such that the resonance wavelength of the ring can be tuned to align with a specific laser wavelength. It should be understood that the control process is a continuing process. It may be repeated at the time period interval. Additionally, a sync signal 318 may be applied between the DWDM transmitter system 310 and the integrated photonics chip 320 to synchronize and assign a time slot for a pair of each individual ring and laser.

Figure 4:
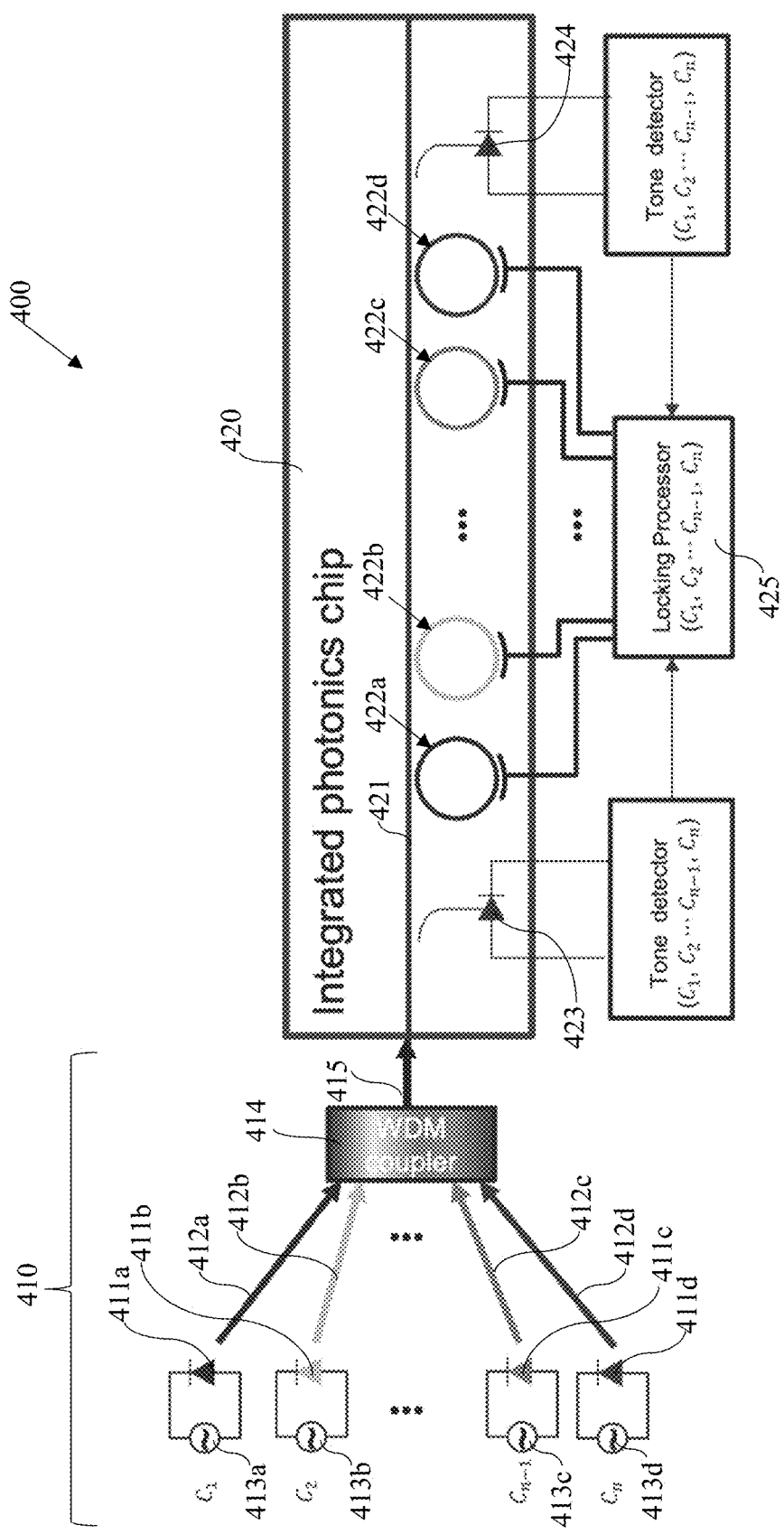
FIG. 4 illustrates another exemplary embodiment of a photonics structure which locks the resonance wavelengths of a plurality of ring resonators using a code division approach, according to an aspect.

FIG. 4 illustrates another exemplary embodiment of a photonics apparatus 400 which locks the resonance wavelengths of a plurality of ring resonators 422a-d using a code division approach, according to an aspect. In the exemplary embodiment shown in FIG. 4, the photonics apparatus 400 may utilize a code division tag to lock each ring resonator to a pre-defined operational wavelength with any channel spacing, as disclosed in greater detail hereinafter. The photonics apparatus 400 may comprise a dense wavelength division multiplexing transmitter system (DWDM transmitter system) 410 and an integrated photonics chip 420. The DWDM transmitter system 410 may comprise a plurality of laser sources 411a-d each emitting light at different wavelengths, a plurality of dithering signals 413a-d, a wavelength division multiplexer coupler (WDM coupler) 414, a carrier 415, as disclosed in greater detail hereinafter. The integrated photonics chip 420 may comprise a bus waveguide (bus) 421, a plurality of ring resonators (rings) 422a-d, two photodetectors 423 and 424, and a ring locking processor (locking processor, processor) 425 as disclosed in greater detail hereinafter.

First, the DWDM transmitter system 410 comprises a plurality of laser sources 411a-d to emit light at different wavelengths. The laser sources 411a-d may be tuned to a predefined wavelength, for example a DWDM grid. Next, a plurality of different dithering signals 413a-d are each assigned a specific code from a set of orthogonal codes. Then, the dithering signals 413a-d are applied to each of the laser sources 411a-d, such that each emitted wavelengths 412a-d have a specific predefined wavelength with a specific dithering signal with an assigned code. Thus, each pre-defined wavelength can be identified by the photodetectors 423,424 via its respective code, as disclosed in greater detail hereinafter. As an example, for DWDM applications there may be 40 laser sources 411a-d emitting light at 40 different wavelengths with 40 different dithering signals 413a-d, respectively.

The plurality of wavelengths with dithering signals 412a-d are then multiplexed onto a carrier 415 by a WDM coupler 414. As an example, the carrier 415 may be a single fiber carrier. The carrier 415 then couples the multiplexed wavelengths onto the integrated photonics chip 420 via a bus waveguide (bus) 421. Integrated along the bus 421 are a first photodetector 423 disposed before the first ring resonator 422a, a plurality of ring resonators 422a-d disposed after the first photo detector 423, and a second photodetector 424 disposed after the last ring resonators 422d. As an example, each ring resonator 422a-d may be a ring modulator with an integrated phase shifter, wherein the integrated phase shifter may be used to set the operation point (i.e., resonance wavelength) of the ring resonator via an applied control signal, as disclosed in greater detail hereinafter. Additionally, the number of ring resonators 422a-d may equal the number of wavelengths 412a-d, such that each wavelength 412a-d has a respective ring resonator 422a-d.

As the multiplexed wavelengths propagate along the bus 421, they enter into a plurality of different ring resonators (rings) 422a-d, where the optical signals of the multiplexed wavelengths are modulated. The operation point of each ring resonator may be set such that the resonance wavelength corresponds to the predefined wavelength 412a-d from one of laser sources 411a-d. For example, the wavelength of the light emitted by laser source 411a corresponds to the resonance wavelength of ring resonator 412a. Lastly, the data modulated optical signals coming out of each ring modulator propagate along the bus waveguide and exit the integrated photonics chip 420.

In order to lock the resonance wavelength of all the rings 422a-d to the corresponding predefined laser source 411a-d wavelengths, two on-chip tapped photodetectors (PDs) 423, 424, disposed before the first ring 422a and after the last ring 422d, are used detect the assigned codes of each dithering signals 413a-b. The photodetectors 423,424 may act as code detectors, for example. Next, the detected dithering signals with assigned codes from the two PDs 423,425 are sent to a processor 425, where each of the dithering signal's characteristics (e.g. the photocurrent (amplitude and phase) ratio and the code correlation coefficient of the dithering signals detected by the second PD over the first PD) is processed. Then the processor 425 uses the identified dithering signals with assigned codes to generate a specific control signal for each individual ring resonator 422a-d. For each individual ring resonator 422a-d, the specific control signal is sent to its integrated phase shifter, such that the resonance wavelength of the ring can be tuned to align with a specific laser wavelength. It should be understood that the control process is a continuing process, which ensures proper operation of the photonics apparatus 400.

Figure 5:
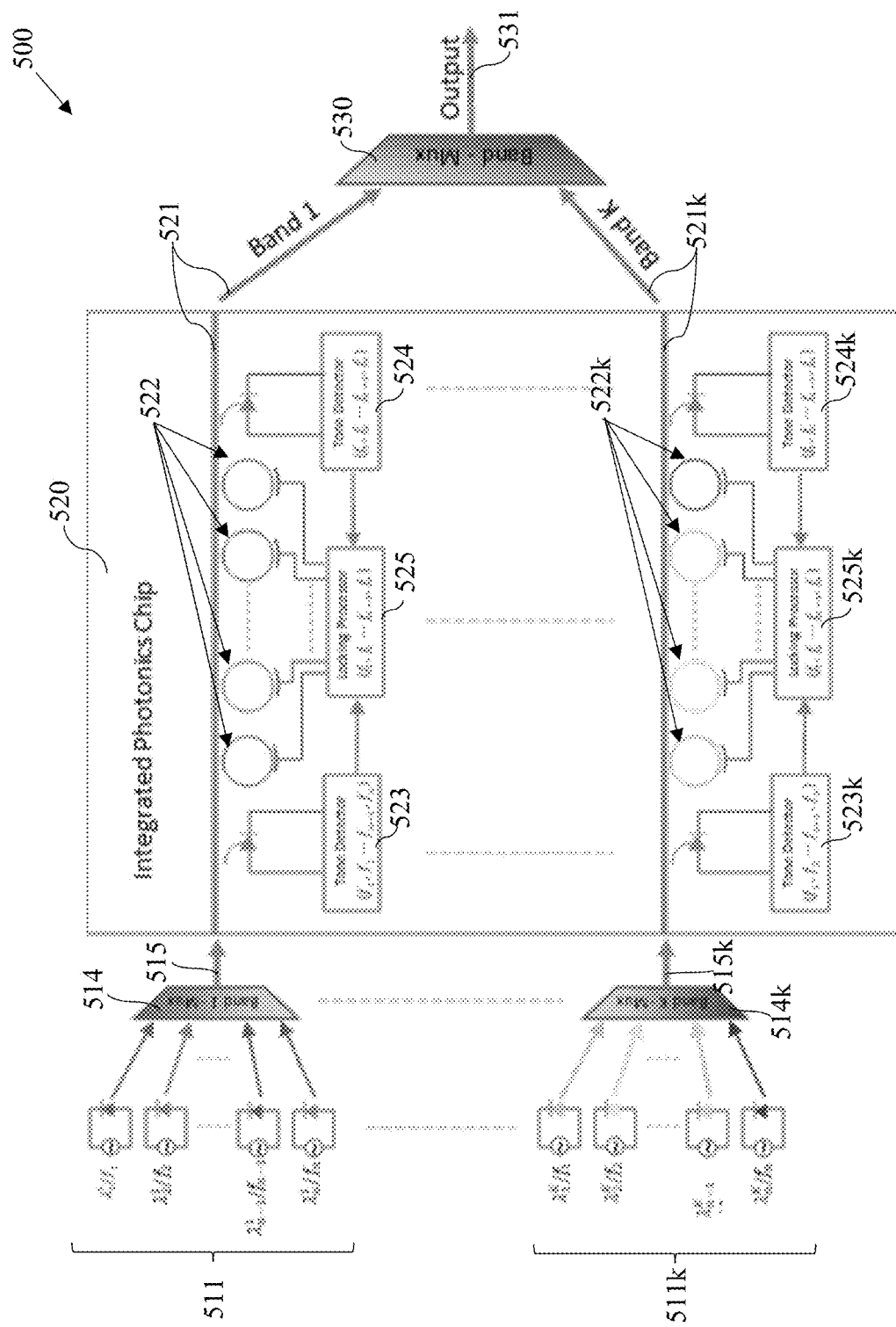
FIG. 5 illustrates another exemplary embodiment of a photonics apparatus, wherein light sources are divided into multiple bands, according to an aspect.

FIG. 5 illustrates another exemplary embodiment of a photonics apparatus 500, wherein light sources 511 and 511k are divided into multiple bands, according to an aspect. As shown in FIG. 5, the light sources 511 and 511k, which may be DWDM channels, are divided into multiple bands.

Firstly, a plurality of laser sources 511,511k emit a plurality of different wavelengths, wherein the wavelengths emitted by each group of laser sources 511,511k are within the same band. Using a tagging system, a tagging signal is applied to each wavelength generated by the laser sources 511,511k. Then, the tagged wavelengths within each band are multiplexed through WDM couplers (Muxs)s 514,514k onto carriers 515,515k, which couples the multiplexed tagged wavelengths onto specific bus waveguides 521,521k for each band. For example, tagged wavelengths multiplexed by WDM coupler 514 are coupled to bus waveguide 521 and tagged wavelengths multiplexed by WDM coupler 514k are coupled to bus waveguide 521k. For a band with only one laser source, the band i-mux can be eliminated by coupling the laser source directly to the bus waveguide. Each bus waveguide has a plurality of ring resonators 522,522k, a first photodetector 523,523k, a second photodetector 524,524k, and a processor 525,525k. As disclosed hereinabove, the processors 525,525k control the resonance wavelengths of the plurality of ring resonator 522,522k, respectively.

Finally, the signals from each bus waveguide 521,521k are multiplexed by a WDM coupler (Mux) 530 outputted 531. As an example, the WDM coupler 530 may be a band-mux. It should be noted that the output band-mux 530 is different from each of the input band i-mux 514,514k. The input band i-mux 514,514k only works for the specific band i. The output band-mux 530 works for all bands and multiplexes all individual band to a single output 531. It should also be noted that the WDM couplers 514,514k and output mux 530 can be integrated into the photonics chip 520, such that they are on the chip 520.

As shown in FIG. 5, the tagging system may be a frequency division tagging system, as disclosed hereinabove. Alternatively, a time division, code division, or hybrid time and frequency division tagging system may be used, as disclosed hereinabove. It should be understood that the same dithering signals used to tag the wavelengths emitted by the laser sources 511 can also be used to tag the wavelengths emitted by the laser sources 511k because laser sources 511 and 511k are multiplexed onto different carriers 515 and 515k. Thus, the dithering signals applied to wavelengths emitted by the laser sources 511 and the dithering signals applied to the wavelengths emitted by the laser sources 511k will not interfere.

One of the advantages of the embodiment shown by FIG. 5, is each separate band can use the same dithering signals, which reduces the number of different dithering signals used and thereby simplifies the control circuit and control algorithm. A second advantage is reducing the total number of wavelengths (i.e., reduce optical handling) on each bus waveguide because each bus waveguide only handles the channels its respective band. A third advantage is the configuration shown in FIG. 5 can support different optical bands (such as O-band, S-band, C-band, and L-band) with a single chip, wherein each bus waveguide on the chip can be optimized to work for a specific band.

Figure 6:
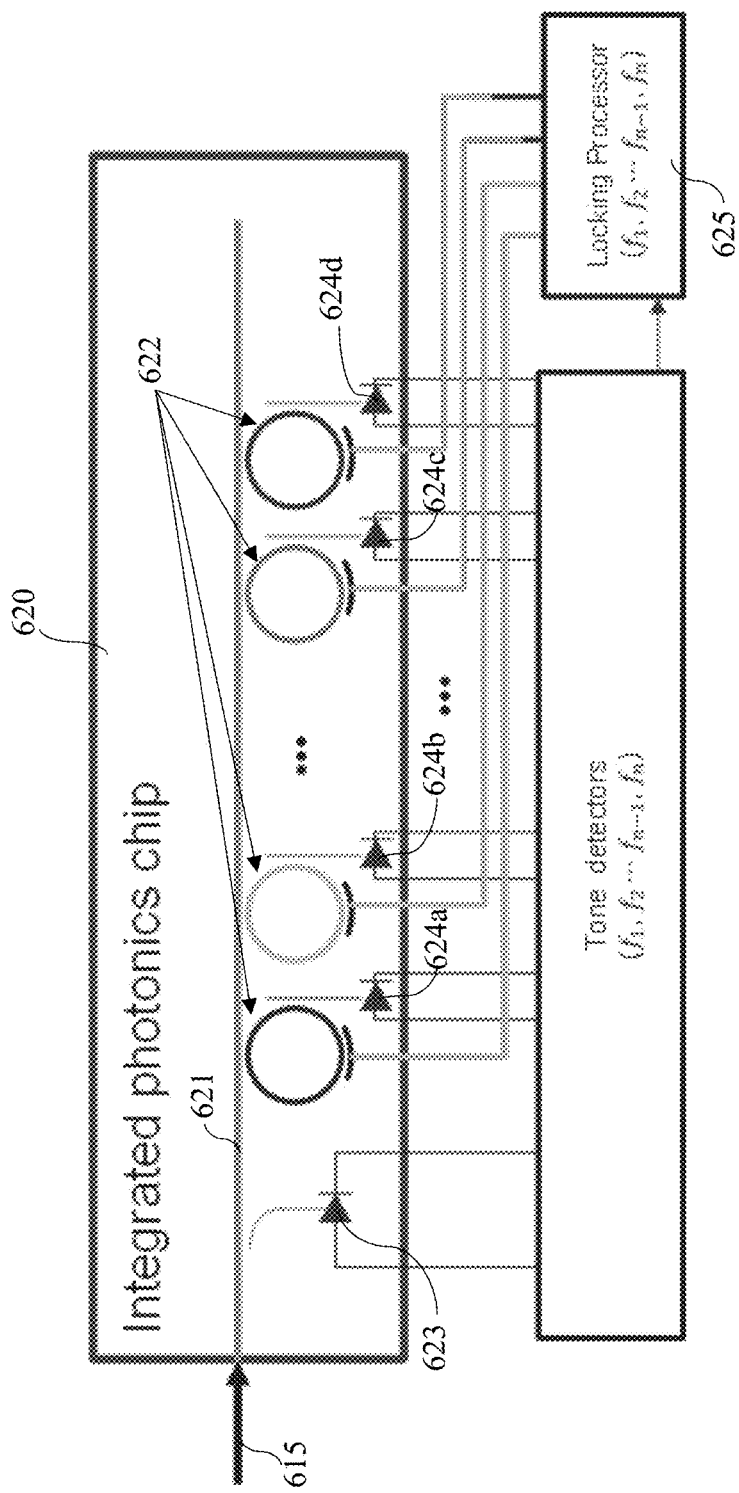
FIG. 6 illustrates an embodiment of the integrated photonics apparatus, wherein the photonics apparatus is applied to the receiver side of a photonics system, according to an aspect.

FIG. 6 illustrates an embodiment of the integrated photonics apparatus 600, wherein the photonics apparatus 600 is applied to the receiver side of a photonics system, according to an aspect. As shown, the photonics apparatus 600 comprises an input port 615, a bus waveguide 621, a plurality of ring resonators 622, a first photodetector 623, a plurality of broadband photodetectors 624a-d, and a processor 625. The processor 625 processes the signals detected by the first photodetector and the plurality of photodetectors and generates control signals to control the resonance wavelengths of the plurality of ring resonators 622. The processor 625 determines the control signals by processing the photocurrent (amplitude and phase) ratio of tagging signals detected by each of the plurality of photodetectors 624a-d to the first photodetector 623.

The embodiment shown in FIG. 6 enables wavelength selection and data signal detection. Using the ring operating-point control procedures disclosed hereinabove, the ring resonators 622 function as wavelength selectors and allow the chip 620 to drop any optical beam to any broadband photodetectors to data receiving port (not shown). This ability is very important for wavelength reconfiguration networks, wherein a different wavelength (i.e., optical beam) may need to be dropped to the same port at different times.

The idea can be applied to various integrated photonics platform, including but not limited to silicon, silicon nitride, silica, Lithium Niobate, polymer, III-V materials, etc. The proposed design can be used for not only C-band, but also for other extended wavelength range including but not limited to visible light range, O, E, S and L band. The potential applications of this invention include but not limited to optical communications, optical sensing, optical computing, automotive, quantum applications, etc.

It may be advantageous to set forth definitions of certain words and phrases used in this patent document. The term "couple" and its derivatives refer to any direct or indirect communication between two or more elements, whether or not those elements are in physical contact with one another. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function, but are intended to cover in scope any equivalent means, known now or later developed, for performing the recited function.

Claim limitations should be construed as means-plus-function limitations only if the claim recites the term "means" in association with a recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or examples. Hence, the scope of the invention is defined by the accompanying claims and their equivalents. Further, each and every claim is incorporated as further disclosure into the specification.

What is claimed is:

1. A photonics apparatus comprising:
   a plurality of laser sources, wherein each of the plurality of laser sources emit a different wavelength of light;
   a laser source tagging system, wherein the tagging system applies tagging signals to the wavelengths emitted by the plurality of laser sources;
   a wavelength division multiplexer configured to receive the tagged wavelengths;
   a carrier in optical communication with the wavelength division multiplexer;
   a bus waveguide integrated on a photonic chip;
   a first photodetector associated with the bus waveguide, wherein the first photodetector is disposed before a plurality of ring resonators;
   a plurality of ring resonators associated with the bus waveguide, wherein the plurality of ring resonators is disposed after the first photodetector;
   a second photodetector associated with the bus waveguide, wherein the second photodetector is disposed after the plurality ring resonators; and
   a processor configured to process the signals from the first and second photodetectors and generate a control signal to control the resonance wavelengths of the plurality of ring resonators.

2. The photonics apparatus of claim 1, wherein the number of ring resonators is equal to the number of laser sources.

3. The photonics apparatus of claim 1, wherein the ring resonators are ring modulators.

4. The photonics apparatus of claim 3, wherein the ring modulators are high-speed data modulators in optical communications.

5. The photonics apparatus of claim 1, wherein a phase shifter is integrated onto each of the plurality of ring resonators.

6. The photonics apparatus of claim 1, wherein the tagging system uses frequency division, and wherein the tagging signals applied to the wavelengths emitted by the light sources are different dithering signals for each wavelength.

7. The photonics apparatus of claim 1, wherein the tagging system uses time division, and wherein the tagging signals applied to the wavelengths emitted by the light sources are the same dithering signal applied to the wavelengths at specific time slots.

8. The photonics apparatus of claim 1, wherein the tagging system uses code division, and wherein the tagging signals applied to the wavelengths emitted by the light sources are dithering signals applied at specific codes.

9. The photonics apparatus of claim 1, wherein a hybrid time division and wavelength division tagging system is used.

10. The photonics apparatus of claim 1, wherein the wavelengths emitted by the laser sources are part of one band.

11. The photonics apparatus of claim 1, wherein the wavelengths emitted by the laser sources are divided into a plurality of bands.

12. The photonics apparatus of claim 1, wherein the number of laser sources is 40 arranged in a dense wavelength division multiplexing grid.

13. A method of locking the resonance frequency of ring resonators of a photonics apparatus, the method comprising the steps of:
   applying a tagging signal to each of a plurality of different wavelengths;
   multiplexing the tagged wavelengths onto a single carrier using a wavelength division multiplexor;
   coupling the multiplexed tagged wavelengths onto a bus waveguide;
   detecting the multiplexed tagged wavelengths with a first photodetector disposed before a first ring resonator and a second photodetector disposed after a last ring resonator of a plurality of ring resonators;
   sending the signals detected by the first and second photodetector to a processor, which identifies and processes the tagging signals;
   generating a control signal for each ring resonator, by the processor; and
   applying the control signals to phase shifters on each ring resonator of the plurality of ring resonators to tune and align the resonance wavelengths of the ring resonators with the wavelengths of the corresponding laser sources.

14. The method of claim 13, further comprising using laser sources to emit the plurality of different wavelengths.

15. The method of claim 13, wherein the tagging is accomplished by frequency division.

16. The method of claim 13, wherein the tagging is accomplished by time division.

17. The method of claim 13, wherein the tagging is accomplished by code division.

18. The method of claim 13, wherein the tagging is accomplished by time and code division.

* * * * *